(12) United States Patent
Gao et al.

(10) Patent No.: US 11,392,964 B2
(45) Date of Patent: **\*Jul. 19, 2022**

(54) PREDICTIVE ANALYTICS FOR LEADS GENERATION AND ENGAGEMENT RECOMMENDATIONS

(71) Applicant: ZoomInfo Apollo LLC, Vancouver, WA (US)

(72) Inventors: Hua Gao, Sunnyvale, CA (US); Vincent Yang, Redwood City, CA (US); Yi Jin, Redwood City, CA (US); Amit Rai, Danville, CA (US)

(73) Assignee: ZOOMINFO APOLLO LLC, Vancouver, WA (US)

( \* ) Notice: Subject to any disclaimer, the term of this patent is extended or adjusted under 35 U.S.C. 154(b) by 394 days.

This patent is subject to a terminal disclaimer.

(21) Appl. No.: 16/528,246

(22) Filed: Jul. 31, 2019

(65) Prior Publication Data

US 2019/0378149 A1 Dec. 12, 2019

Related U.S. Application Data

(63) Continuation of application No. 15/040,942, filed on Feb. 10, 2016, now Pat. No. 10,380,609.

(Continued)

(51) Int. Cl.
*G06Q 30/02* (2012.01)
*G06Q 10/06* (2012.01)
(Continued)

(52) U.S. Cl.
CPC ....... *G06Q 30/0201* (2013.01); *G06F 16/951* (2019.01); *G06Q 10/0637* (2013.01);
(Continued)

(58) Field of Classification Search
CPC .............. G06Q 30/02; G06Q 30/0201; G06Q 30/0276–0277; G06Q 30/06;
(Continued)

(56) References Cited

U.S. PATENT DOCUMENTS 7,043,531 B1   5/2006  Seibel et al.
9,202,227 B2  12/2015  Kahlow
(Continued)

OTHER PUBLICATIONS

Feature-Based recommendations for one-to-one marketing. Sung-Shun Weng. Mei-Ju Liu. Expert Systems with Applications, vol. 26, Issue 4. May 2004. (Year: 2004).

(Continued)

*Primary Examiner* — William J Allen
(74) *Attorney, Agent, or Firm* — Summit Patents, PC (57) ABSTRACT

An automated predictive analytics system disclosed herein provides for generating sales leads with lead engagement recommendations. In one implementation, the system determines similarities between fitness, engagement, and intent characteristics of a plurality of target clients and fitness, engagement, and intent characteristics of an entity's existing clients. Subsequently, the system generates recommendations for engagement with the plurality of target clients, wherein components of the recommendations for engagement are based on determined similarities between the fitness, engagement, and intent characteristics of the plurality of target clients and the fitness, engagement, and intent characteristics of the entity's existing clients. The system presents the plurality of leads with the recommendations of engagement to using a graphical user interface (GUI) at the application layer of the system.

20 Claims, 5 Drawing Sheets

Related U.S. Application Data (60) Provisional application No. 62/114,068, filed on Feb. 10, 2015.

(51) Int. Cl.
  *G06F 16/951* (2019.01)
  *G06Q 30/06* (2012.01)

(52) U.S. Cl.
  CPC ..... *G06Q 30/0204* (2013.01); *G06Q 30/0631* (2013.01); *G06Q 30/0641* (2013.01)

(58) Field of Classification Search
  CPC ..... G06Q 30/0601–0643; G06Q 30/08; G06Q 10/0637; G06N 5/00; G06N 5/003; G06N 5/02; G06N 5/022; G06N 5/027; G06N 99/005; G06N 20/00; G06F 16/90; G06F 16/906–909; G06F 16/95–951
  See application file for complete search history.

(56) References Cited

U.S. PATENT DOCUMENTS

| | | |
|---|---|---|
| 2015/0046219 A1 | 2/2015 | Shavlik |
| 2015/0379602 A1 | 12/2015 | Gupta et al. |
| 2016/0048854 A1 | 2/2016 | Kahlow |

OTHER PUBLICATIONS

Weng et al., "Feature-Based recommendations for one-to-one marketing", Expert Systems with Applications, vol. 26, Issue 4. May 2004 (Year: 2004).

Park et al., "A Literature Review and Classification of Recommender Systems Research", Expert Systems with Applications 39 (2012) 10059-10072, doi:10.1016/j.eswa.2012.02.038.

PREDICTIVE ANALYTICS FOR LEADS GENERATION AND ENGAGEMENT RECOMMENDATIONS

CROSS-REFERENCE TO RELATED APPLICATIONS

This application is a Continuation of pending application Ser. No. 15/040,942, filed Feb. 10, 2016 entitled, "IMPROVED WEB CRAWLING FOR USE IN PROVIDING LEADS GENERATION AND ENGAGEMENT RECOMMENDATIONS," which claims benefit of and priority to U.S. Provisional Application No. 62/114,068 filed on Feb. 10, 2015 entitled "PREDICTIVE ANALYTICS FOR LEADS GENERATION AND SCORING." The disclosures set forth in the referenced applications are incorporated by reference herein in their entireties.

FIELD

Implementations disclosed herein relate, in general, to information management technology and specifically to predictive analytics technology.

BACKGROUND

In sales and marketing, there exists the concept of a funnel that represents the pool of leads or potential customers in the various stages of the sales process. At the top of the funnel exists the largest pool of leads, and the volume drops off as they traverse the sales stages and get filtered out according to their interest, needs, understanding of the product, and other qualifying criteria. Every business has its own targeting, marketing, engagement, education, and sales processes to try to get leads to move as quickly and cost effectively as possible through the funnel to become paying customers.

SUMMARY

An automated predictive analytics system disclosed herein provides for generating sales leads with lead engagement recommendations. In one implementation, the system determines similarities between fitness, engagement, and intent characteristics of a plurality of target clients and fitness, engagement, and intent characteristics of an entity's existing clients. Subsequently, the system generates recommendations for engagement with the plurality of target clients, wherein components of the recommendations for engagement are based on determined similarities between the fitness, engagement, and intent characteristics of the plurality of target clients and the fitness, engagement, and intent characteristics of the entity's existing clients. The system presents the plurality of leads with the recommendations of engagement to using a graphical user interface (GUI) at the application layer of the system.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTION

Disclosed herein is an automated system and method for guiding and optimizing the lead generation and scoring processes using a combination of data mining, natural language processing, and machine-learning techniques. For example, the automated system disclosed herein can be used to provide a client with a list of sales leads and lead engagement recommendations. The automated system includes a module for determining similarities between fitness, engagement, and intent characteristics of a plurality of target clients and fitness, engagement, and intent characteristics of an entity's existing clients. In the context of an example company Alpha (hereinafter "Alpha") that is in the business of providing maintenance and repair services for mobile devices, the fitness characteristics of the existing clients of Alpha may include, for example, the average number of employees of the existing clients, the type of business of the existing clients, etc. For example, the automated system may determine that a fitness characteristic of the existing clients is that generally existing clients in the trucking industry are more likely to use the services of Alpha.

The engagement characteristics of the existing clients of Alpha may include, for example, how the existing clients are engaging with the company for requesting services, requesting help, providing feedback, responding to marketing messages, etc. In the example case, the automated system may identify an engagement characteristics of the existing clients as the fact that the existing clients are more likely to request services during off-peak hours, such as from late PM to early AM, and are more likely to purchase services after receiving a few trial services for free. The intent characteristics of the existing clients may include, for example, short term user intent as indicated by clicks on content, browsing of content, comments, etc. In the example illustration, the automated system may determine an intent characteristic of the existing clients for Alpha as the fact that the existing clients tend to engage the service of Alpha after reading several online comparisons of screen repair services.

The automated system subsequently collects a large amount of unstructured text data from public data sources such as public websites, bulletin boards, blogs, social media networks, etc. The collected data is analyzed for similar fitness, engagement, and intent characteristics as indicated by the existing clients of Alpha. Thus for example, the automated system may analyze the data collected from the public sources to identify potential target clients that are in the trucking industry, specifically trucking companies that are specialized in making off-hour deliveries, etc. The automated system may also analyze the available data to see if such target companies have recently read online articles comparing screen repair service providers.

The automated system also generates recommendations for engagement with the plurality of target clients. The components of the recommendations for engagement may be based on determined similarities between the fitness, engagement, and intent characteristics of the plurality of target clients and the fitness, engagement, and intent characteristics of the entity's existing clients. Subsequently, the leads with the engagement recommendations are presented to the client's sales and/or marketing team for action. For example, the automated system may identify target companies Beta and Theta as potential sales leads with similarities of fitness, engagement, and intent characteristics. In other words, the automated system may determine that Beta is also in the trucking industry, it makes off-hour deliveries, and its personnel recently read online articles about screen repair services. In that case, an application layer of the automated system includes a list of target clients that includes Beta. Furthermore, the application layer also provides engagement recommendation along with the list of target clients, including a recommendation to the sales personnel to offer a free trial to Beta. The engagement recommendation may also include a recommendation to the sale person to emphasize during a sales presentation that Alpha specializes in providing off hours support and that it has other clients that are in the trucking industry. Providing such engagement recommendations to the sales person allows the sales person to personalize the sales presentation or pitch to Beta, which results in higher sales lead conversion rate.

At a high level, there are three major subsystems and/or frameworks of the automated system disclosed herein. The first is a data acquisition and analysis system that collects and processes publicly available unstructured text and third party proprietary information and data on companies, individuals, and other business-related entities. This system uses smart crawlers to collect and aggregate publicly available unstructured text and application-programming interfaces (APIs) to ingest data from third party vendors, publisher networks, and other sources. Specifically, the smart crawler used to collect publicly available unstructured text may crawl the available universe of websites, categorize data collected from various web pages into a number of categories, and analyze the categorized data. For example, the web page categorization may categorize all data from the product and services pages into a category to determine the type of industry for the potential target, it may categorize all data from the contacts pages to determine the contact information for the potential targets, etc. If the crawler receives any email text data, blog data, etc., it may categorize such data to determine the engagement and intent characteristics of the potential targets. Furthermore, data that is used to generate the intent and engagement characteristics may also be collected from APIs to third party vendors, publisher networks, etc.

The second subsystem is a client-related framework that connects to various internal databases, tools, and other systems used by clients. These typically include customer relationship management (CRM) systems (e.g. Salesforce, Netsuite, Microsoft Dynamics), marketing automation systems (e.g. Marketo, Eloqua, Pardot), email systems (e.g. Gmail, Hotmail), web agents collecting behavioral web analytics for client customers, customer success platforms (ZenDesk, etc.), and other systems and tools used by clients. The internal data collected from the internal sources may be analyzed to determine the fitness, engagement, and intent characteristics of the existing clients. In the example case, the CRM of Alpha may be analyzed to determine the fitness of the existing clients, which may tell Alpha various characteristics of its clients in the trucking industry. Such analysis of the CRM may also indicate that the clients in the trucking industry have generated more tickets for services during off hours than during regular business hours.

The third subsystem is an optimization, modeling, machine-learning, and analytics framework that leverages all of the information made available by the first two subsystems to generate algorithm-assisted automated decisions for sales and marketing teams. This system makes predictions to aid decision-making processes or to automatically make decisions and take action directly for the client. For example, such optimization, modeling, machine-learning, and analytics framework may determine which of the fitness, engagement, and engagement characteristics are more important compared to others, adjust statistical models for scarcity of data points, etc. As an example, if an analysis of the data collected from the internal data sources of Alpha suggests that out of 1000 companies in their funnel there are only 50 companies in the trucking industry, however, the majority of these 50 converted, the statistical model may be trained to not deemphasize this type of industry observation, even when there are relatively limited number of data samples that generate the successful outcome.

A further understanding of the nature and advantages of the present technology may be realized by reference to the figures, which are described in the remaining portion of the specification.

Figure 1:
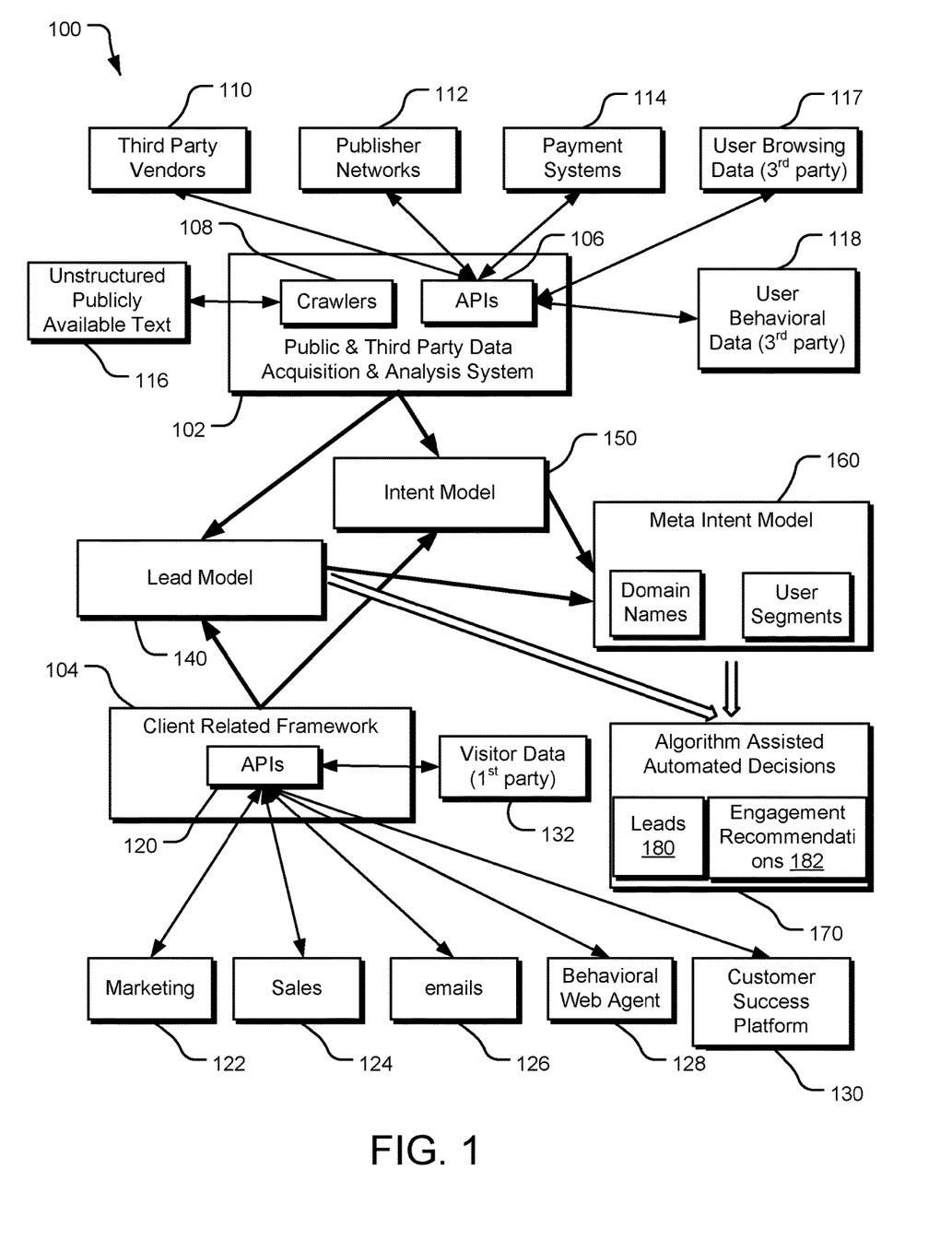
FIG. 1 illustrates an example block diagram representing a predictive analytics system disclosed herein.

FIG. 1 illustrates an example block diagram representing a predictive analytics system 100 disclosed herein. The system 100 includes a public and third party data acquisition and analysis system 102 and a client related framework 104. The system 102 includes various APIs 106 and crawlers 108. The APIs 106 interacts with various third party vendors 110, publisher network 112, payments systems 114, etc., to collect various data about companies, customers, potential clients, etc. The crawlers 108 interact with public networks such as the Internet to collect unstructured publicly available text 116, such as text available from web pages, etc. The system 102 analyzes the data collected by the APIs 106 and/or the unstructured text accumulated by the crawlers 108.

The client related framework 104 also includes various APIs 120 that interact with various data sources, tools, and systems used by a client, also referred to as first party. For example, the APIs 120 interact with a marketing automation system 122 (e.g. Marketo, Eloqua, Pardot), a sales or sales support system 124 (e.g. Salesforce, Netsuite, Microsoft Dynamics), an email system 126 (e.g., Outlook, Gmail, etc.), a behavioral web agent 128 (e.g., Google Analytics), and a customer success platform 130 (e.g., ZenDesk, Bluenose, etc.). The client related framework 104 collects and analyzes the client related information, also referred to as the first party information, gathered from one or more of the sources 122-130.

The frameworks of the system 100 are designed to be applicable to businesses in any sector or industry, as each potential client has a unique business model as well as a unique customer base and profile. The first party sales and marketing data from each client contains information on which leads have exhibited desirable progress, and which are poor fits or unqualified for the client's products and services. This information is used to generate labels for model training sets.

Each of the systems 102 and the client related framework 104 provides input to a fit model 140, an engagement model 155 and an intent model 160. The modeling modules use optimization and machine-learning, etc., to generate various algorithm assisted automated decisions 170 for the client. The fit model 140 leverages all of the available data to make predictions and give estimates or insights to clients to aid their decision-making processes, or to automatically make decisions and take action directly. In particular, the fit model is built upon business-related signals collected for each company or lead.

The engagement model 155 utilizes data collected from the client related framework 104 to make predictions based on a lead's engagement with the client through website visit and click behavior, email responses, and other behaviors directly related to the client's assets. For example, the engagement model 155 may take as an input various context tables, activities, etc., by various users, analyze various sequences or sets of activities with respect to various assets such as emails, web pages, etc., analyze the time stamp of such activities, determine comment sections of various interactive assets, analyze words in the email, etc., to determine how a user is engaging or likely to engage with a client. Various predictions can be made, such as what content to provide next, as well as what time to best engage any given lead.

The intent model 160 uses first party data such as the visitor data 132 received from the client related framework 104, third party user browsing data 117 and third party behavioral data 118 received from the system 102, etc., which capture short-term user intents to identify and quantify relevant intents among all possible intents by potential clients. In one implementation, the fit model 140 and the engagement model 155 may also provide input to the intent model 160. The intent model 160 may be based on supervised and unsupervised machine learning technologies. The intent model 160 may also use known user behaviors and responses to train the models so that these models are able to identify intent types and intent intensities.

The intent model 160 produces high fit company domain names and builds relevant user segments associated with the domains. The intent model 160 also merges data together by domain names and user identifications by mapping user IP addresses to domains and by a method of user identification syncs. The user segments are used for digital advertisements, online marketing campaigns, etc., that can be used to develop and nurture users. The output from the intent model 160 is also used to generate various algorithm assisted automated decisions 170 for a client.

For example, the algorithm assisted automated decisions 170 may generate an application layer graphical user interface (GUI) that provides a list of leads 180 and engagement recommendations for the leads 182. In the example case of Alpha, the leads 180 may be listed based on the similarities between the fitness, engagement, and intent characteristics of the leads 180 and the fitness, engagement, and intent characteristics of the existing clients of Alpha. For example, the leads 180 may include Beta together with engagement recommendation 182 for Beta, Theta with engagement recommendation 182 for Theta, etc. An example engagement recommendation 182 for Beta may include the data point that existing clients similar to Beta have responded favorably to free trial services, the contact information for the purchasing manager of Beta, etc.

From the collection of the client related or first party information, publicly available data sources, and $3^{rd}$ party providers, the system forms a large arsenal of business-related indicators and features with which to represent companies, individuals, and other entities in a machine-computable fashion. Such indicators include, but are not limited to, the technology stack used, employee composition, hiring pattern, website structure, social trend, product types, business news events, revenue, and company size. During training, the model learns which features and combinations of features are positive or negative characteristics that affect the chances a lead will make desirable progress. Each model is automatically and uniquely tuned to the client's specific customer personas.

Broad examples of applications are lead scoring, lead generation, and lead engagement recommendations. In the former, the trained customer model can make predictions or estimates of the fit or propensity of a lead in any stage of the sales funnel. In lead generation, the trained customer model can be used to score a universe of leads, detect and pass net-new, high propensity leads to the client. If historical data is available around the journey of a lead through various touch points by the client, models can be built to predict the next best action. Ultimately, the platform aims to answer who, what, when, and how to target, engage, and sell to potential prospects, across any stage of the sales funnel.

Figure 2:
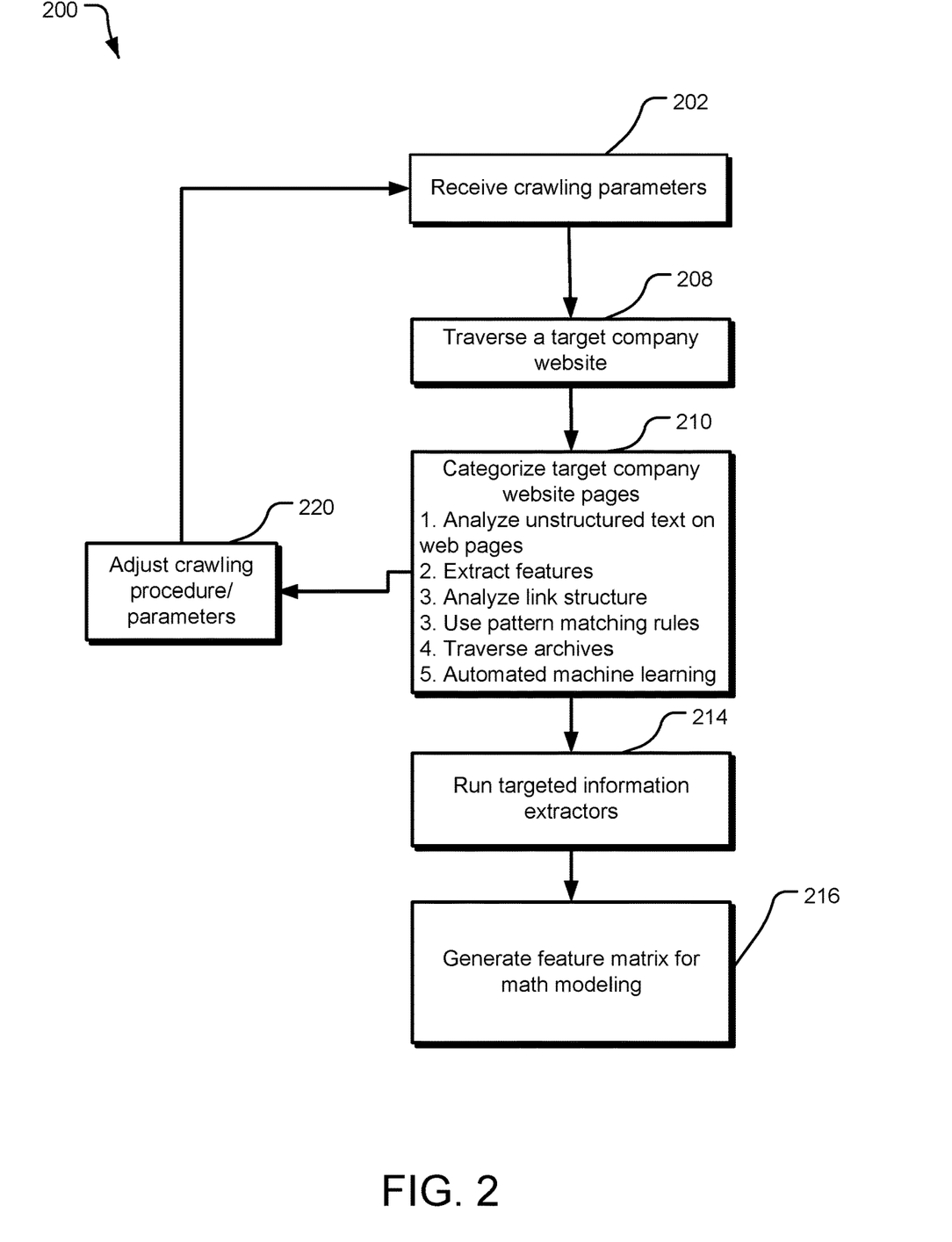
FIG. 2 illustrates an example flowchart of the smart crawling method used by the predictive analytics system disclosed herein.

FIG. 2 illustrates an example flowchart 200 of the smart crawling method used by the predictive analytics system disclosed herein. For application of predictive full funnel demand generation, one important aspect is the acquisition of data and knowledge about companies for use in differentiating them from one another. One of the most prevalent sources of information is a company's website. Web crawling is the systematic browsing and downloading of web pages using an automated software system. Traditional crawlers traverse a network of web pages by recursively following the hyperlinks found on each visited page and saving each web page as it goes.

A crawler system disclosed herein traverses a company's website more intelligently, mimicking human behavior when analyzing or researching a company. Specifically, in one implementation, the crawler system disclosed herein crawls the website to collect and analyze unstructured text.

An operation 202 receives various crawling parameters and an operation 208 traverses a target company's website using the parameters. As web pages are traversed, at operation 210 they are categorized into certain page types, e.g., Product and Solutions pages, Team pages, Contact pages, Investor pages, Client pages, Partner pages, News and Blog archives, Pricing pages, etc. The categorization is performed through natural language processing and machine-learning techniques by analyzing the content and/or code of the page, as well as the link structure defining how each page points to other pages. In simple cases, pattern-matching rules can be defined on link text to associate the linked page with one or more page types. More advanced methods involve extracting features from the text, images, documents, or other content on each web page, which a trained classifier uses to categorize the page into one or more page types.

The results of the categorization operation 210 may be used by a feedback operation 220 to adjust one or more crawling procedures and parameters. For example, the categorization of each page and/or hyperlink is also used to control or guide the crawl procedure, which can significantly reduce the number of irrelevant pages crawled, reduce the time required for crawling a company's website, and also increase the precision and/or recall of the page categorization methods. If there is a limited set of desired page types that may be useful for our application, the system can then ignore pages that fall outside of these page types, significantly reducing the crawl time and the storage requirements. Using the current or previously traversed pages as prior knowledge, the system can increase the precision of categorizing the pages linked on the current page by exploiting correlations between page types that are commonly linked together. Similarly, the system can also increase the recall of certain page types for a company website by deeper crawling following common patterns in link structures, e.g. Product pages often link to more specific Product pages, or About pages link to Team or Client pages.

Once each page is categorized, an operation 214 runs targeted information extractors on specific page types with high precision. For example, the system can extract members of the executive team along with their titles, departments, contact information, and biographies from Team pages. From Contact pages the system can extract street addresses, phone numbers, email addresses, and other contact information. From Product and Solutions pages the system can extract product keywords that give insight into the company's industry or sector, and even to micro segment into specific product types. From Client or Partner pages, the system can establish client-vendor and cooperative relationships, and form a graph of connections in the business universe. On News portals or Blog pages, the system can iteratively traverse paginated archives and extract news articles and announcements about the companies; from this data the system can further detect events such as product launches, fundraises, mergers and acquisitions, lawsuits, personnel changes, and many more signals that give insight into the health or growth of a company. Many other possibilities and opportunities exist.

Finally, an operation 216 generates the feature matrix for mathematical modeling. In an example feature matrix, each row may include a training example and each column may hold a numerical representation of a feature. For example, the numerical representation of the feature may be a binary value for a categorical feature, a continuous value for an ordinal feature, etc. For efficient storage and processing of data, an implementation of the feature matrix may use sparse data representation where only non-zero values and positions are stored and all other values of the features are assumed to be zero. An example feature matrix may have each row representing a target company and each column providing a value of a feature, where such value may be binary value, continuous value, etc. For example, a feature may be the size of the target company and in which case, the value may be the number of employees in that company. Such feature matrix may be continuously updated, however, historical values of the features may also be stored so that they maybe used for analysis.

Figure 3:
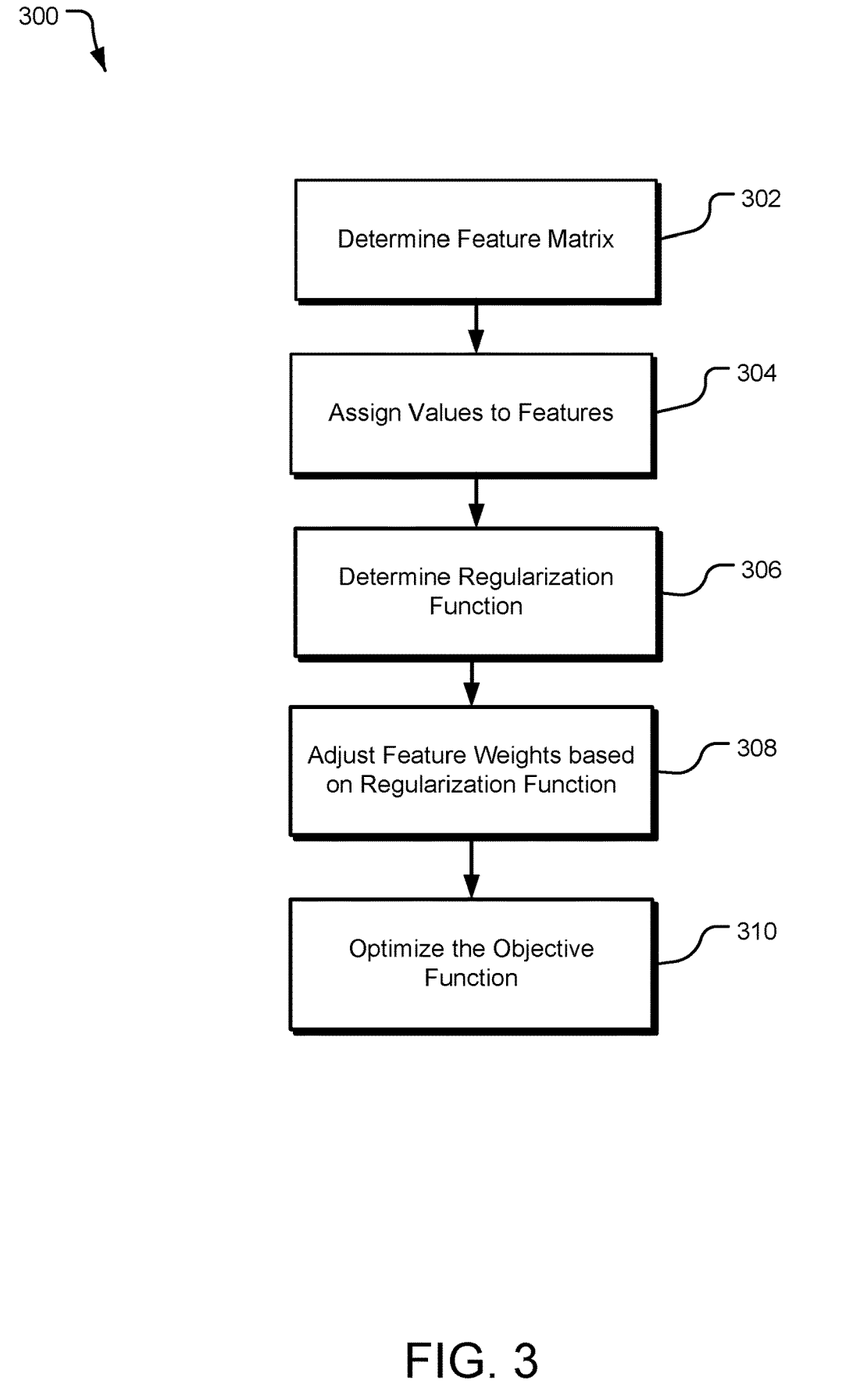
FIG. 3 illustrates an example flowchart of a training and machine-learning method used by the predictive analytics system disclosed herein.

FIG. 3 illustrates an example flowchart 300 of a training and machine-learning method used by the predictive analytics system disclosed herein.

The vast majority of businesses in the world are private companies, which typically have limited information readily available in public structured formats. Beyond the company websites, there are no comprehensive data sources, either public or proprietary, with complete coverage of every company. Any feature engineering and feature extraction based on these incomplete data sources will likewise generate features that have incomplete and sparse coverage. These data conditions similarly exist for many other entities, such as individual persons, in real-world settings.

For optimal performance, many traditional machine-learning algorithms prefer "academic" conditions in which every feature is known for every training example, contrary to what the system can realistically get. Put another way, the sparse data coverage results in a situation where the number of training examples is typically much less than the number of features because each data source or feature set has partial company coverage and the system is appending many feature sets together to get the most overall coverage.

Training a machine-learning model involves the optimization of an objective function related to the task at hand, e.g. the likelihood of the labeled training set or a loss function that increases with misclassifications. It is very common for machine-learning algorithms to employ methods to control for over-fitting during the training process in order to ensure good performance on previously unseen examples or future predictions. Typically, this is achieved by adding a regularization term to the objective function that penalizes overly complex models or parameter configurations that may have overfit to noise in the training data. A general objective function J is given below, where it is a combination of a cost function on the model parameters θ, features matrix X, and labels y, plus a regularization function on the model parameters that is weighted by hyperparameter λ.

$$J(\theta,X,y,\lambda)=f_{cost}(\theta,X,y)+\lambda f_{regularization}(\theta)$$

Given a labeled training set (X, y), the training process finds the optimal model parameters θ that minimize the objective function. Example cost functions for machine learning models include the negative log likelihood function for logistic regression, hinge loss function for support vector machines (SVM), squared loss function for linear regression, etc.

Tikhonov or L2 regularization, based on the squared L2-norm of the model parameters, and Lasso or L1 regularization, based on the L1-norm of the model parameters, are the most prevalent regularization methods. Under the data conditions described previously, where the number of training examples are sometimes much fewer than the number of features, L1 regularization usually yields better performance than L2 regularization. Alternatively, performance using L2 regularization can be recovered by employing feature selection methods in conjunction, where less valuable features are first removed from consideration, e.g. according to univariate statistical tests for value.

Mathematically, the regularization function for L2 regularization is $$f_{regularization}(\theta) = \|\theta\|_2^2 = \theta^T \theta = \sum_i \theta_i^2.$$

This function imposes a penalty for each model parameter that grows quickly with the square of the parameter value, thereby discouraging large values that would have led to overemphasis and over-fitting on any particular parameter. As an example, the additional penalty for increasing a parameter $\theta_i$ from 10 to 20 is significantly larger than the penalty for increasing it from 0 to 10; the square relationship implies that decreasing parameter values yields diminishing returns on the reduction of the regularization penalty as the parameters approaches zero.

Similarly, the regularization function for L1 regularization is $$f_{regularization}(\theta) = \|\theta\|_1 = \sum_i |\theta_i|.$$

As before, this function also imposes a penalty on large parameter values, but the tradeoffs are different from that of L2 regularization. In this case, the additional penalty for increasing a parameter $\theta_i$ from 10 to 20 is exactly the same as the additional penalty for increasing it from 0 to 10. In contrast to L2 regularization, there are no diminishing returns, in terms of reducing the regularization penalty, for decreasing a parameter value to zero. Therefore, the minimization of the objective function usually results in models where many parameters or feature weights are optimized to zero.

Both of the aforementioned high-performance cases, with feature selection plus L2 regularization and with L1 regularization, have a potentially undesirable property where many features are ignored. This is immediately obvious in the former case given the feature selection process. When using L1 regularization, many model parameters are naturally optimized to zero, effectively exhibiting the same property. While these methods typically yield models with better predictive performance than using L2 regularization alone, the system loses the ability to assign contributions for every feature. From a user experience point of view, this is very unintuitive because our features have been carefully designed to have business sense and presenting the majority of features to have no value undermines our messaging and model comprehensibility.

The system has identified the mechanism that degrades the performance of L2 regularization alone under the non-ideal data conditions, and have used a novel regularization technique and training algorithm that works well in those conditions, often exceeding the performance of the other two common regularization methods without needing to remove or zero out any features.

Specifically, as illustrated in FIG. 3, an operation 302 determines a feature matrix for the machine-learning model. For example, such feature matrix may be determined based on the structural features for the mathematical modeling as generated by the operation 216. An operation 304 determines predictive values of one or more of such features based on their individual predictive powers. For example, a feature may be defined as having high value if the conversion rate of the subset of training examples that exhibit the feature is significantly different from the baseline conversion rate of the entire set of training examples, i.e. the feature is highly predictive amongst the set of companies that is covered by this feature or its underlying data source. Under the typical data conditions described earlier, many features have low coverage and therefore the penalty resulting from the L2 regularization term, a function solely of the feature weights, easily overtakes any potential reductions in the cost function, which typically depends on the classification performance on the training set. In other words, the regularization penalty of high value feature weights is disproportionately high compared to the reduction in the cost function when the feature itself has low coverage.

An example illustration of a rare but valuable feature's effect on the outcome of an offer for a service is illustrated in the table I provided below.

TABLE I

|  | Positive Outcomes | Negative Outcomes | Positive Outcomes Rate |
| --- | --- | --- | --- |
| Has Feature | 40 | 10 | 0.8 |
| Without/Missing Feature | 10 | 390 | 0.025 |
| Overall | 50 | 400 | 0.111 |

For example, in the case of the service being fixing mobile devices, the feature could be that the lead is a trucking company but its routes have many stops with load/unload processes rather than no intermediate stops in a long point-to-point journey. As shown in the table, amongst the leads exhibiting this feature crow 1), presumably because it's easier to accidentally damage mobile devices during load/unload cycles than while driving in a truck cabin, the leads tend to have greater need of, and are more likely to, purchase the service for fixing mobile devices. In practice, it may be difficult to obtain this data point on many trucking companies (as shown in row 3) because most don't publish their routes, but when this rare signal is detected, there is meaningful lift and it should not be discounted because of its low coverage.

An operation 306 determines a regularization function. Specifically, an example regularization function is disclosed by the second term of the equation below:

$$J(\theta,X,y,\lambda_1,\lambda_2) = f_{cost}(\theta,X,y) + \lambda_1 \theta^T (D(X,y))^{\lambda_2} \theta$$

The function D yields a diagonal matrix that varies the regularization penalties for the features relative to each other, and can take into account the values (as described earlier) of the features as well as their coverages. An additional hyperparameter $\lambda_2$ is added to compress or exaggerate the relative penalization and is tuned along with $\lambda_1$ during cross validation testing. An operation 308 applies a regularization function to the objective function.

Finally, an operation 310 optimizes the new objective function. Optimization of this new objective function yields models that perform better than those trained with L2 regularization alone, and often better than those trained with L1 regularization or L2 regularization with feature selection. There are significant practical advantages. The first is that the system no longer needs to choose between models trained with different regularization methods, whose performances vary depending on our client's customer base and data intricacies; our new algorithm reliably trains the best performing models. The second is that all of our carefully crafted features with business sense are utilized, allowing us to white-box the model and show human-comprehensible results to our clients. Lastly, the system is able to add more and more data sources or feature sets over time, regardless of the value or coverage for any particular client, without having to worry about degrading performance.

Figure 4:
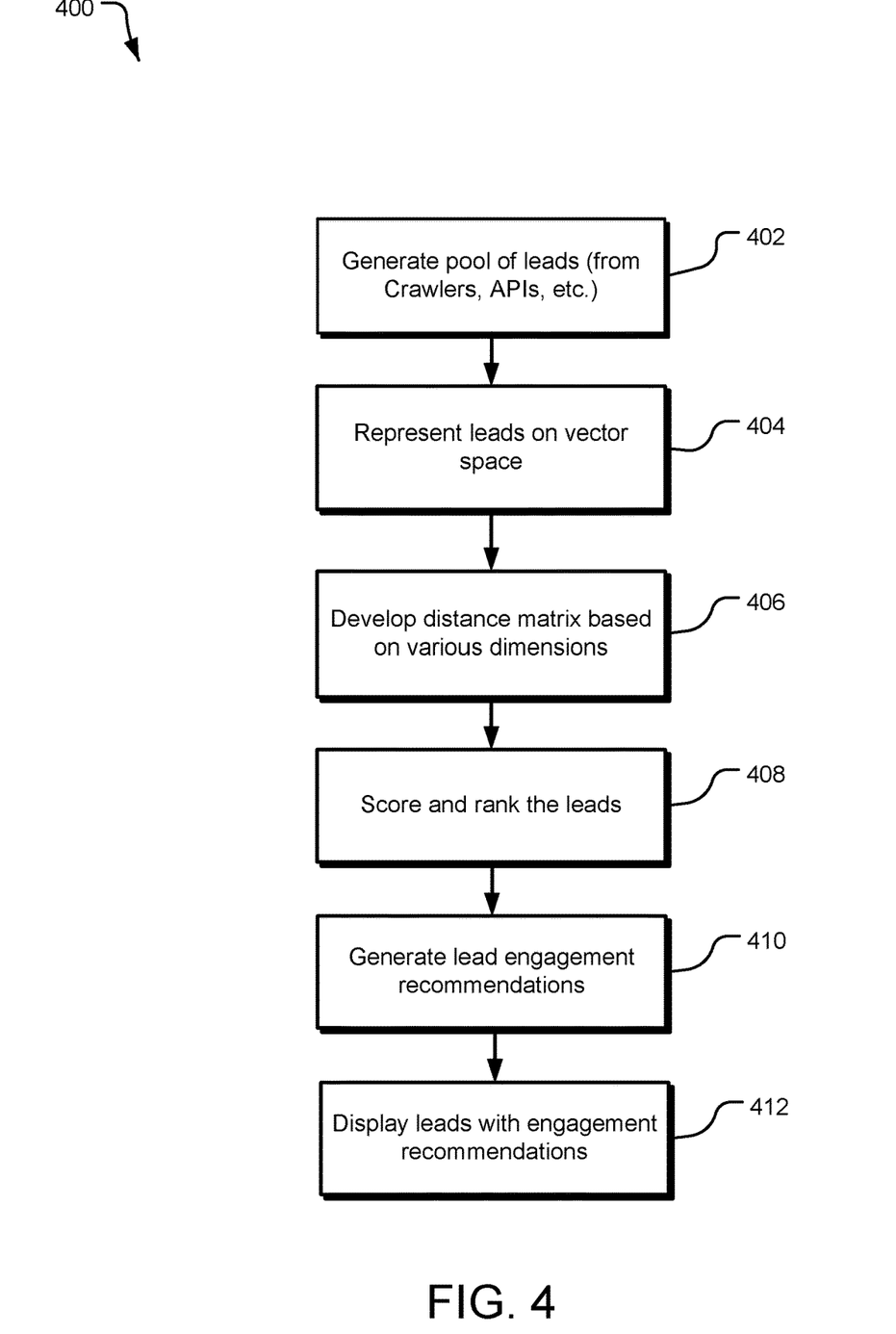
FIG. 4 illustrates an example flowchart of a lead scoring and lead generation operations used by the predictive analytics system disclosed herein.

FIG. 4 illustrates an example flowchart 400 of a lead scoring and lead generation method used by the predictive analytics system disclosed herein.

An operation 402 generates a pool of leads by analyzing unstructured text collected by crawlers and other third party information generated by the APIs. Every business has a pool of organic leads captured in CRM and/or marketing automation systems that have found their way into the sales funnel one way or another during the lifetime of the business. It is very common for these leads to be biased in some way towards certain industries, locations, company sizes, and other factors compared to the overall distribution of all leads in the universe. For example, a business that sells farm equipment will likely have few, if any, movie theaters, banks, or other types of businesses that have no need for farm equipment, in their CRM system. This has implications on the applications of a customer model trained on the leads within the client's CRM, particularly on lead generation. The model learns to discriminate positive and negative leads only amongst the organic, biased types of leads that are in the CRM system, but does not necessarily learn to discriminate the organic leads from the universal pool of leads; this effect is more pronounced if the client's organic leads are highly biased or niche, and less pronounced if the client's organic leads are similarly distributed as the universe of leads.

To generate higher quality leads, the system does not merely use the customer model directly to score the universe of leads. Instead, the system initially selects sets of leads that are similar to the organic types of leads, and then apply the customer model which is trained to discriminate well amongst the organic types of leads. For most clients, the organic lead bias is typically concentrated in the industry because product offerings are almost never universal and provide value only in certain domains. Therefore, in one implementation the selection process selects companies that are semantically similar to the organic leads, or put another way, the system performs a set expansion upon the organic leads and find more companies that do similar things.

To achieve this practically, an operation 404 uses a semantic model to represent the leads on the vector space such that semantically similar companies are also close together in this vector space. The training is performed on the universe of companies, and the process is unsupervised, i.e. does not need labels. The system learns to map and embed information about companies automatically into the vector space according to commonly occurring patterns.

Subsequently an operation 406 develops a distance matrix measuring the distances between leads represented on the vector space. In order to ensure the representation is related to what the company does semantically, the system engineer features based on natural language processing of text that potentially describes the company in terms of product and services. Natural language processing techniques can include text cleaning and normalization, tokenization, part-of-speech tagging, named entity recognition, and dependency parsing. With our unique crawling system, the system is able to catalogue a company's web pages into various relevant page types, including products, services, news, and blogs. Beyond these valuable sources of information, the system can also utilize descriptions or structured data from social networks, news reporting sites, and other business intelligence data vendors.

Autoencoders, latent dirichlet allocation, hierarchical dirichlet processes, principal components analysis, independent components analysis, factor analysis, latent semantic analysis (a.k.a. singular value decomposition), and non-negative matrix factorization are example techniques which can be used to drive the representation learning. The key to good performance, however, remains in the feature engineering and using the most semantically relevant data sources.

Once the companies are represented in the desired vector space, the similarity between companies can be computed using distance metrics, e.g. cosine distance or Euclidean distance. To create a pool of companies that are semantically similar to a client's organic customer base, a simple method is to find the set of nearest neighbors to those organic companies. More advanced methods involve building a business graph where nodes are companies and edges are functions of the similarity measures and other relationship information between companies. From this, graph algorithms can be used to perform the set expansion using more sophisticated scoring or ranking functions.

An operation 408 scores the leads using company similarity matrix to first rank the universe of companies to identify a subset of companies that are most similar to the organic types of companies present in a client's CRM. Subsequently, the system applies the client's customer model to score the pool of the identified companies for their propensity to convert and generates a second ranking. The first ranking operation may use mainly semantic features based on unstructured text that describes what each of the companies from the pool of companies does. The second ranking may use indicators describing all business related signals.

In other implementations, company similarity can be defined in alternative contexts, for example, similarity in technology adoption, similarity in location, similarity in growth rate, similarity in the personnel composition of the marketing department, etc. The contexts are defined by the vector space in which the companies are represented and the similarity is, again, typically a distance measure in that space. Presenting these similarities in various aspects helps to justify our machine generated recommendations, provide talking points or actionable insights to drive the initial conversation to more easily sell into the account.

An operation 410 generates lead engagement recommendations for each lead. Such recommendations may include, for example, the history of the lead, the fitness, engagement, and intent characteristics of the lead as compared to the fitness, engagement, and intent characteristics of the existing clients of a company, the contact information, etc. An example recommendation for a lead for a company in the legal industry may be information about the current litigation that the lead is engaged in and similar litigation where the company has successfully provided services to its existing clients. Another example of an engagement recommendation for a lead for a company providing IT services may be information about IT problems noted by the lead's employees on public blogs and successful resolution of IT tickets directed to similar problems as identified by the company's CRM system. An operation 412 displays the leads with engagement recommendation using a GUI at the application layer of the automated lead generation system.

To summarize, the primary benefit of representation learning is to be able to filter the universe of leads to natural segments of leads where a client's customer model would perform well in discriminating between high propensity and low propensity leads. This allows us to generate very high fit leads for our clients. Furthermore, semantic similarity allows us, for each generated lead, to report similar companies from a client's CRM that are already customers. Similarity in other contexts provide additional justification and actionable insight for how to approach and engage with the account. This significantly improves the user experience because it becomes apparently obvious and understandable why the system generated each lead, thereby galvanizing trust in our platform, and supports our overall effort and theme of providing white-box, human comprehensible insights.

As a whole, the system disclosed herein significantly increases the conversion rate by focusing the right effort towards high-propensity leads. Typical clients using the system see an average 200% increase in conversion rate, along with a large corresponding revenue increase. The system also significantly increases the sales velocity of leads; by focusing on the right leads at the right time with the right message, clients typically see a 2-4× decrease in time to close a lead.

Finally, the system disclosed herein also significantly increases the brand trust of leads. Using traditional "spray and pray" methods of email marketing, companies send many emails to any and all prospects, causing them to unsubscribe. Companies tend also to hire large telemarketing teams to cold call all of their leads. Without targeting, they usually cause leads to feel uncomfortable and pressured, resulting in loss of brand trust. Using the solution disclosed herein, companies are able to engage (email or call) the right prospects with the right message at the right time.

Figure 5:
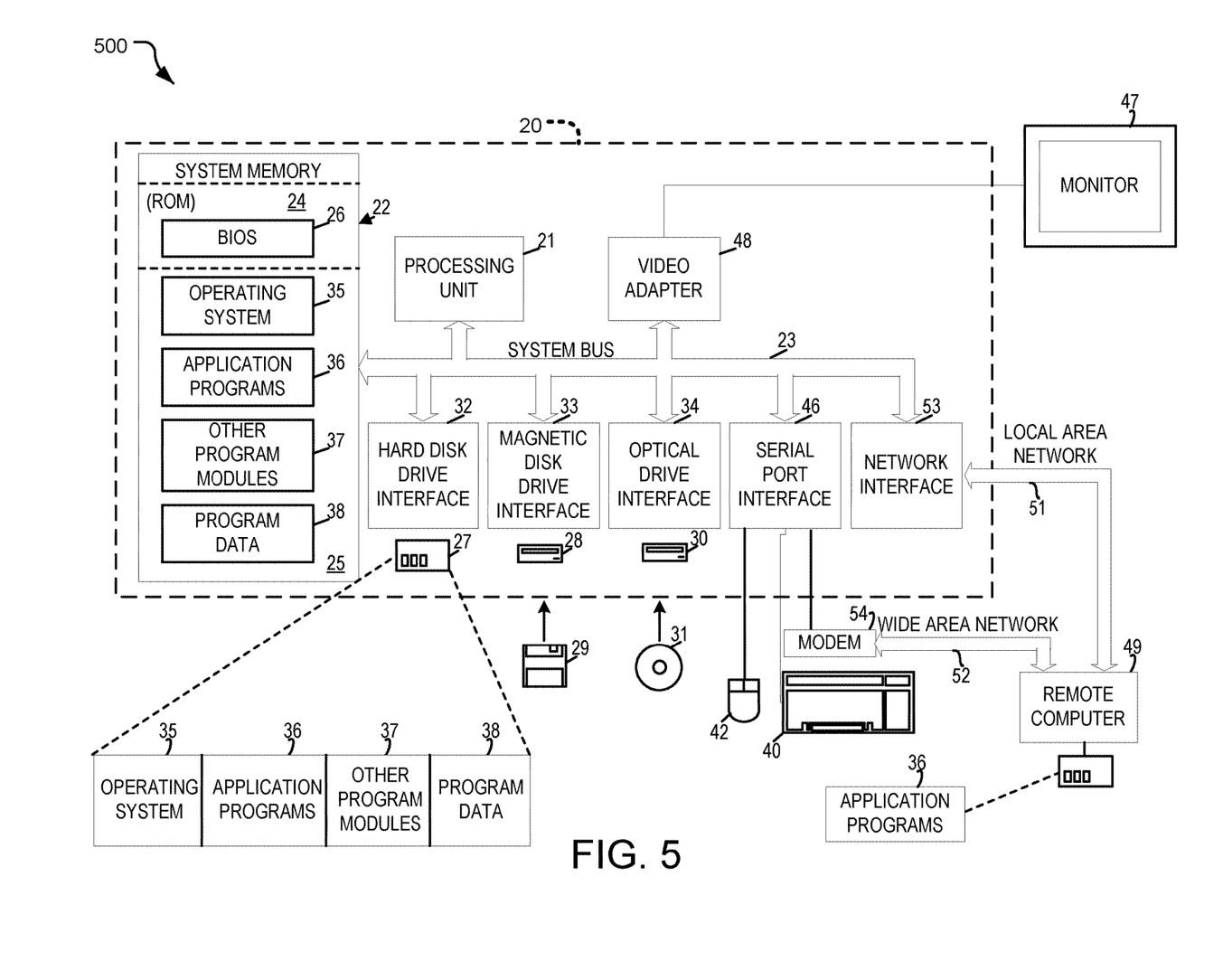
FIG. 5 illustrates an example system that may be useful in implementing the predictive analytics technology disclosed herein.

FIG. 5 illustrates an example system that may be useful in implementing the described predictive analytics technology. The example hardware and operating environment of FIG. 5 for implementing the described technology includes a computing device, such as general purpose computing device in the form of a gaming console or computer 20, a mobile telephone, a personal data assistant (PDA), a set top box, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a search management system, various applications, search context pipelines, search services, service, a local file index, a local or remote application content index, a provider API, a contextual application launcher, and other instructions and data may be stored in memory 22 and/or storage devices 29 or 31 and processed by the processing unit 21.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

Embodiments of the present technology are disclosed herein in the context of an electronic market system. In the above description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application- and business-related constraints, and that those specific goals will vary from one implementation to another and from one developer to another.

According to one embodiment of the present invention, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present technology, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A computer-implemented method, wherein one or more computing devices comprising storage and a processor are programmed to perform steps comprising:
    generating recommendations for engagement with the plurality of target clients, wherein components of the recommendations for engagement are based on determined similarities between (a) a fitness, engagement, and intent characteristics of a plurality of target clients and (b) a fitness, engagement, and intent characteristics of an entity's existing clients;
    categorizing a plurality of web pages, hyperlinks, and link structures located over the Internet using a trained classifier that uses features from content and code on web pages;
    crawling, by a computer, the plurality of web pages, hyperlinks, and link structures based on the categorization of the plurality of web pages, hyperlinks, and link structures to collect third party unstructured text information; and
    generating a feature matrix for the target client and comparing one or more value of the feature matrix of the target client with one or more values of a feature matrix for the entity's existing clients to generate the recommendations of engagement.

2. The computer-implemented method of claim 1, further comprising:
    analyzing the third party unstructured text information to generate the fitness characteristics of the plurality of target clients.

3. The computer-implemented method of claim 2, wherein crawling the plurality of web pages, hyperlinks, and link structures further comprises:
    traversing a target client website to collect target client unstructured text information;
    categorizing the target company website pages into one or more categories; and
    analyzing the target client unstructured text information per each of the one or more categories; and
    extracting target company fitness information.

4. The computer-implemented method of claim 3, further comprising adjusting parameters of the crawling based on automated machine learning of the target client unstructured text information.

5. The computer-implemented method of claim 4, further comprising presenting a plurality of leads with the recommendations of engagement.

6. The computer-implemented method of claim 5, further comprising: determining predictive values of one more feature of the features matrix; determining a regularization function based on the feature matrix;
    adjusting feature weights based on the regularization function; and
    applying the adjusted regularization function to an objective function to generate a new objective function.

7. The computer-implemented method of claim 6, further comprising optimizing the new objective function.

8. The computer-implemented method of claim 1, further comprising traversing, using one or more application programming interfaces, a plurality of the entity's internal data sources to generate the fitness characteristics of the entity's existing clients.

9. The computer-implemented method of claim 8, further comprising:
    determining various engagement characteristics of the plurality of the entity's existing clients based on analysis of data collected by the application programming interfaces.

10. The computer-implemented method of claim 1, wherein presenting the plurality of leads with the recommendations of engagement further comprises presenting the plurality of leads with the recommendations of engagement using a graphical user interface (GUI) at an application layer of a leads management system.

11. The computer-implemented method of claim 10, wherein the recommendations of engagement of the target client is an observed purchasing pattern of the target client determined based on analysis of the publicly available unstructured text related to the target client.

12. The computer-implemented method of claim 1, wherein the intent characteristic of the target client is based on a publicly available browsing behavior of one or more employees of the target client.

13. A physical article of manufacture including one or more devices encoding computer-executable instructions for executing on a computer system a computer process, the computer process comprising:
    generating recommendations for engagement with a plurality of target clients, wherein components of the recommendations for engagement are based on determined similarities between (a) a fitness, engagement, and intent characteristics of the plurality of target clients and (b) a fitness, engagement, and intent characteristics of an entity's existing clients;
    generating a feature matrix for the target client and comparing one or more value of the feature matrix of the target client with one or more values of a feature matrix for the entity's existing clients to generate the recommendations of engagement;
    categorizing a plurality of web pages, hyperlinks, and link structures located over the Internet using a trained classifier that uses features from content and code on web pages;
    crawling, by a computer, the plurality of web pages, hyperlinks, and link structures based on the categorization of the plurality of web pages, hyperlinks, and link structures to collect third party unstructured text information.

14. The physical article of manufacture of claim 13, wherein the computer process further comprising analyzing the third party unstructured text information to generate the fitness characteristics of the plurality of target clients.

15. The physical article of manufacture of claim 13, wherein the computer process further comprising:
    traversing a target client website to collect target client unstructured text information;
categorizing target client website pages into one or more categories; and
    analyzing the target client unstructured text information per each of the one or more categories; and
extracting target client fitness information.

16. The physical article of manufacture of claim 13, wherein the computer process further comprising adjusting parameters of the crawling based on automated machine learning of the target client unstructured text information.

17. The physical article of manufacture of claim 13, wherein the computer process further comprising presenting the plurality of leads with the recommendations of engagement.

18. The physical article of manufacture of claim 13, wherein the computer process further comprising:
   determining predictive values of one more feature of the feature matrix;
   determining a regularization function based on the feature matrix; and
   adjusting feature weights based on the regularization function.

19. The physical article of manufacture of claim 18, wherein the computer process further comprising applying the adjusted regularization function to an objective function to generate a new objective function.

20. The physical article of manufacture of claim 18, wherein the computer process further comprising optimizing the new objective function.

\* \* \* \* \*